US009395132B2

(12) United States Patent
Stewart et al.

(10) Patent No.: US 9,395,132 B2
(45) Date of Patent: Jul. 19, 2016

(54) METHODS AND SYSTEMS FOR ENHANCING FIREARM SAFETY THROUGH WIRELESS NETWORK MONITORING (71) Applicant: Gunnegate, LLC, Capitola, CA (US)

(72) Inventors: Robert John Stewart, Soquel, CA (US); James Schaff, Pacifica, CA (US); Paul Hammond, San Jose, CA (US)

(73) Assignee: Yardarm Technologies, Inc., Capitola, CA (US)

( * ) Notice: Subject to any disclaimer, the term of this patent is extended or adjusted under 35 U.S.C. 154(b) by 0 days.

(21) Appl. No.: 14/023,371

(22) Filed: Sep. 10, 2013

(65) Prior Publication Data

US 2014/0290109 A1 Oct. 2, 2014

Related U.S. Application Data (63) Continuation-in-part of application No. 13/954,903, filed on Jul. 30, 2013, which is a continuation-in-part of application No. 13/913,478, filed on Jun. 9, 2013.

(60) Provisional application No. 61/853,179, filed on Apr. 1, 2013, provisional application No. 61/853,971, filed on Apr. 16, 2013, provisional application No. 61/825,985, filed on May 21, 2013.

(51) Int. Cl.
*F41A 17/00* (2006.01)
*F41A 17/06* (2006.01)
*E05B 45/00* (2006.01)
(Continued)

(52) U.S. Cl.
CPC .............. *F41A 17/063* (2013.01); *E05B 45/005* (2013.01); *E05B 45/06* (2013.01); *F41A 17/08* (2013.01)

(58) Field of Classification Search
CPC ....... F41A 17/063; F41A 17/08; E05B 45/06; E05B 45/005
USPC .......................... 42/70.11, 1.01, 106; 340/542
See application file for complete search history.

(56) References Cited

U.S. PATENT DOCUMENTS 4,556,872 A * 12/1985 Masoncup .............. E05B 45/06
340/542
4,811,578 A * 3/1989 Masoncup ............ E05B 45/005
340/542

(Continued)

FOREIGN PATENT DOCUMENTS

WO 01/84069 A1 11/2001

OTHER PUBLICATIONS

Wikipedia Signalling System No. 7 (http://web.archive.org/web/20121128195932/https://en.wikipedia.org/wiki/Signalling_System_No._7), web on the internet archive Nov. 28, 2012.*

(Continued)

*Primary Examiner* — Michelle R Clement
(74) *Attorney, Agent, or Firm* — Ascenda Law Group, PC (57) ABSTRACT

A firearm includes a firing mechanism and a sensor. The sensor is configured for wireless communication over s short range RF network with a hub worn or carried by a user of the firearm. The hub includes a subscriber identity module configured to communicate with a server over a signaling channel of a wireless telecommunications network. The sensor device is configured to control a enable/disable mechanism in the firearm in accordance with instructions received from the hub.

4 Claims, 3 Drawing Sheets (51) Int. Cl.
*E05B 45/06* (2006.01)
*F41A 17/08* (2006.01)

(56) References Cited

U.S. PATENT DOCUMENTS

| | | | |
|---|---|---|---|
| 5,194,845 A * | 3/1993 | Sirmon | B62H 5/20 200/61.64 |
| 5,553,311 A * | 9/1996 | McLaughlin et al. | 710/64 |
| 6,223,461 B1 * | 5/2001 | Mardirossian | F41A 17/06 42/70.11 |
| 6,357,156 B1 * | 3/2002 | Klebes et al. | 42/70.11 |
| 6,415,542 B1 * | 7/2002 | Bates et al. | 42/70.11 |
| 6,421,943 B1 * | 7/2002 | Caulfield et al. | 42/70.11 |
| 6,477,801 B1 * | 11/2002 | O'dwyer | 42/70.11 |
| 6,823,621 B2 * | 11/2004 | Gotfried | 42/70.06 |
| 6,975,204 B1 * | 12/2005 | Silver | 340/5.31 |
| 7,594,416 B2 * | 9/2009 | Bosin | E05B 37/0068 340/542 |
| 7,600,339 B2 * | 10/2009 | Schumacher et al. | 42/70.01 |
| 7,703,229 B2 * | 4/2010 | Parhofer | F41A 17/063 42/70.01 |
| 7,849,624 B2 * | 12/2010 | Holt et al. | 42/70.01 |
| 7,921,588 B2 * | 4/2011 | Brown et al. | 42/70.01 |
| 8,046,948 B2 * | 11/2011 | Mauch et al. | 42/70.01 |
| 8,127,482 B2 * | 3/2012 | O'Shaughnessy et al. | 42/70.11 |
| 8,166,693 B2 * | 5/2012 | Hughes et al. | 42/70.08 |
| 8,312,660 B1 * | 11/2012 | Fujisaki | 42/70.11 |
| 8,339,257 B2 | 12/2012 | Cazanas et al. | |
| 8,375,838 B2 * | 2/2013 | Rudakevych et al. | 89/27.11 |
| 8,584,388 B1 * | 11/2013 | Fujisaki | 42/70.11 |
| 8,931,195 B2 * | 1/2015 | Milde, Jr. | F41A 35/00 42/66 |
| 8,966,797 B2 * | 3/2015 | Carlson | F41A 17/063 42/1.01 |
| 2001/0032407 A1 * | 10/2001 | Cain et al. | 42/70.11 |
| 2001/0033228 A1 * | 10/2001 | Kisreman et al. | 340/568.1 |
| 2002/0032976 A1 * | 3/2002 | Riener | 42/70.11 |
| 2002/0178635 A1 * | 12/2002 | Martin | 42/70.11 |
| 2004/0098584 A1 * | 5/2004 | Sherman et al. | 713/168 |
| 2005/0000139 A1 * | 1/2005 | Mauch et al. | 42/70.01 |
| 2005/0066567 A1 * | 3/2005 | Newkirk et al. | 42/70.11 |
| 2005/0153729 A1 * | 7/2005 | Logan et al. | 455/550.1 |
| 2005/0188583 A1 * | 9/2005 | Jackson et al. | 42/70.11 |
| 2005/0262751 A1 * | 12/2005 | Leslie | 42/70.01 |
| 2006/0208857 A1 * | 9/2006 | Wong | 340/5.82 |
| 2007/0037605 A1 * | 2/2007 | Logan | 455/567 |
| 2007/0074438 A1 * | 4/2007 | Parhofer | F41A 17/063 42/70.01 |
| 2007/0180749 A1 * | 8/2007 | Schumacher et al. | 42/70.01 |
| 2007/0271830 A1 * | 11/2007 | Holt et al. | 42/70.01 |
| 2007/0271831 A1 * | 11/2007 | Newkirk et al. | 42/70.01 |
| 2007/0277420 A1 * | 12/2007 | Newkirk et al. | 42/70.01 |
| 2007/0284474 A1 | 12/2007 | Olson et al. | |
| 2008/0032268 A1 * | 2/2008 | Farrell et al. | 434/16 |
| 2008/0079581 A1 * | 4/2008 | Price | 340/572.1 |
| 2008/0092610 A1 * | 4/2008 | Kuo | E05B 47/00 70/264 |
| 2008/0121097 A1 * | 5/2008 | Rudakevych et al. | 89/28.05 |
| 2008/0289237 A1 * | 11/2008 | Pikielny | 42/70.11 |
| 2009/0037374 A1 * | 2/2009 | Delia et al. | 707/3 |
| 2009/0064557 A1 * | 3/2009 | Hughes et al. | 42/70.01 |
| 2011/0030262 A1 * | 2/2011 | O'Shaughnessy et al. | 42/70.01 |
| 2011/0056108 A1 * | 3/2011 | McCord et al. | 42/70.01 |
| 2011/0061280 A1 * | 3/2011 | Emde et al. | 42/70.06 |
| 2011/0300944 A1 * | 12/2011 | Raynal | 463/42 |
| 2012/0090038 A1 * | 4/2012 | Pacella et al. | 726/30 |
| 2012/0142314 A1 | 6/2012 | Mohammed | |
| 2012/0220307 A1 * | 8/2012 | Wohlert et al. | 455/456.1 |
| 2012/0329538 A1 * | 12/2012 | Hall | 463/2 |
| 2013/0239453 A1 * | 9/2013 | Trimble | 42/106 |
| 2015/0068093 A1 * | 3/2015 | Milde, Jr. | F41A 17/063 42/70.11 |
| 2015/0241153 A1 * | 8/2015 | Mardirossian | F41H 13/0018 42/70.11 |

OTHER PUBLICATIONS

Gunnegate, LLC; PCT/US2013/045002 filed Jun. 10, 2013; International Search Report and Written Opinion; ISA/KR; mailed Dec. 17, 2013; 14 pages.
English translation of WO2001/84069 (Delsy Electronics Components AG).
GSM Overview (http://www.telecomspace.com/gsm.html).
European Telecommunications Standards Institute, "Digital cellular telecommunications system; Unstructured Supplementary Service Data (USSD)—Stage 2 (GSM 03.90)," Dec. 1996.

* cited by examiner

METHODS AND SYSTEMS FOR ENHANCING FIREARM SAFETY THROUGH WIRELESS NETWORK MONITORING

RELATED APPLICATION

This application is which is a CONTINUATION-IN-PART of U.S. application Ser. No. 13/954,903 filed Jul. 30, 2013, which is a CONTINUATION-IN-PART of U.S. application Ser. No. 13/913,478, filed Jun. 10, 2013, which claims the priority benefit of (a) U.S. Provisional Patent Application No. 61/853,179, filed Apr. 1, 2013, (b) U.S. Provisional Patent Application No. 61/853,971, filed Apr. 16, 2013, and (c) U.S. Provisional Application 61/825,985, filed May 21, 2013, each of which is incorporated herein by reference in its respective entirety.

FIELD OF THE INVENTION

The present invention relates to methods and systems for monitoring and, optionally, controlling, handheld firearms and other instruments using embedded sensor devices that are configured to send and receive signals over a wireless communications network.

BACKGROUND

Firearm safety is a topic of political and societal debate in the United States. Prior efforts to improve the safety of handheld firearms have included devices such as manual safeties, decockers, drop safeties, safety notches, firing pin blocks, hammer blocks, magazine disconnects, trigger guards, fingerprint sensors, loaded chamber indicators and even radio controlled proximity activation devices which permit operation of the firearm only when it is within range of a fob or similar device. While these devices offer varying degrees of physical safety, none are concerned with defining an area within and for which a firearm may be enabled or disabled from operation or with notifying an owner of an attempt to access, move or operate the owner's firearm. Further, no existing solutions communicatively couple a firearm to its owner via a wireless telecommunications network and a machine-to-machine ("M2M") component located within the firearm so as to control a firearm safety mechanism or its equivalent. Nor do any existing solutions establish a network-based (e.g., cloud-based) rule-set through which a firearm owner can establish and/or customize firearm control variables, such as a default trigger safety status. Further, no existing solutions enable a firearm owner to be provided with location, movement, and/or similar information regarding the location and/or status of the firearm (e.g., via a wireless communication network) and further enable the owner to disable the firearm via a user interface of a wireless device (e.g., mobile phone) applet.

BRIEF DESCRIPTION OF THE DRAWINGS

The present invention is illustrated by way of example, and not limitation, in the figures of the accompanying drawings in which.

DETAILED DESCRIPTION

In the above-referenced U.S. application Ser. No. 13/954,903, methods and systems for monitoring and, optionally, controlling, handheld firearms using embedded sensors configured to send and receive signals over a signaling channel of a wireless communications network were described. Briefly, a firearm configured in accordance with the invention described in the '903 Application includes a firing mechanism and a sensor device. The sensor device includes a subscriber identity module (SIM) configured to communicate with a server over a signaling channel of a wireless communications network. The sensor device is configured to enable/disable the firing mechanism in accordance with instructions received by the SIM from the server.

Described herein are methods and systems for monitoring and, optionally, controlling, multiple handheld firearms or related instruments using embedded sensors which communicate with a personal hub device worn or carried by an individual utilizing the firearms or related instruments. The hub is configured to send and receive signals over a signaling channel of a first wireless communications network in the fashion described in the '903 Application and to communicate with the embedded sensors in each of the firearms and other instruments over one or more second wireless communications networks. The first wireless communications network is preferably a mobile telecommunications network, that includes a common signaling channel, such as one compliant with signaling system 7 (SS-7), which refers to a set of standards defining telephony signaling protocols. Thus, in one embodiment, the first wireless communication network may be a Global System for Mobile Communications (GSM) telecommunications network. The second wireless communication network(s) may be short-range radio frequency (RF) communications networks, such as those compliant with Bluetooth or Bluetooth Low Energy (BLE) wireless communication protocols. The second wireless communication network may be a single network through which all of the firearms and related instruments carried by an individual communicate with the hub device or it may be a plurality of ad hoc wireless communications networks by which each individual firearm or other instrument communicates with the hub device but not with others of the firearms or related instruments. For purposes of the present description, a single, second wireless communication network will be referred to, but readers should recognize that this is simply for purposes of ease of description and actual instantiations of the invention may include multiple such networks.

Figure 1:
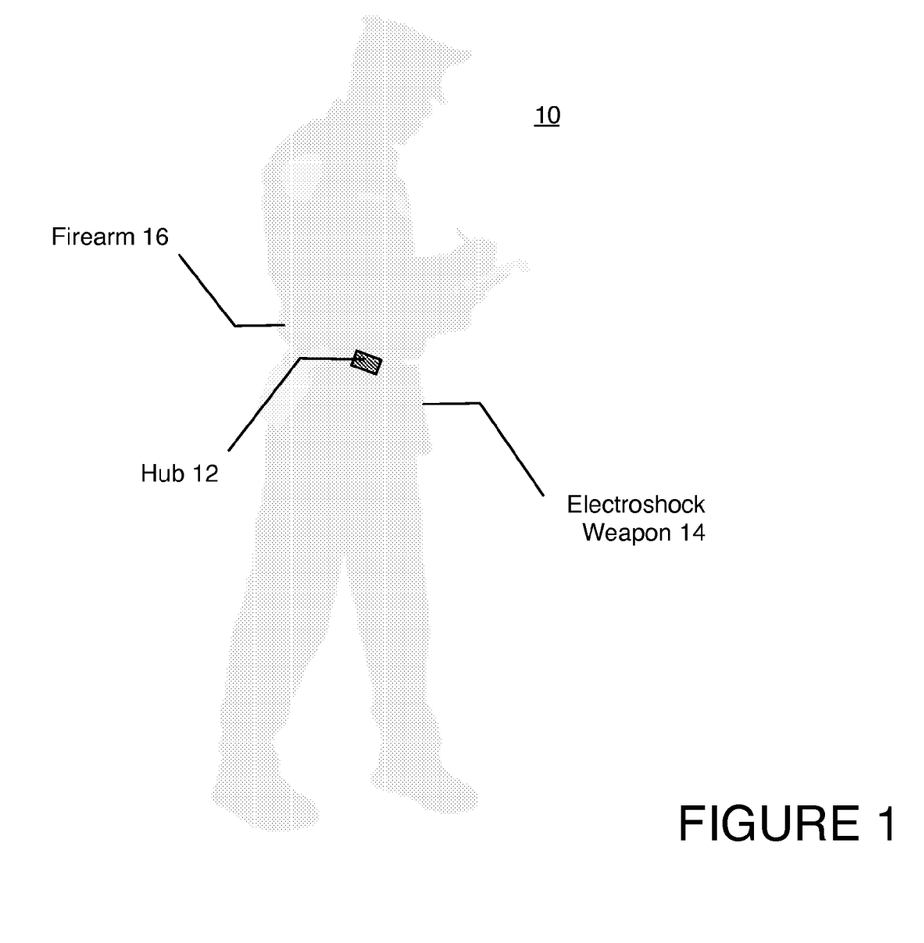
FIG. 1 illustrates an example of an individual outfitted with components of a system configured for monitoring and, optionally, controlling, handheld firearms and other instruments using embedded sensors in accordance with embodiments of the present invention.

FIG. 1 illustrates an example of an individual 10, in this case a police officer, wearing a utility belt on which is included a personal hub 14 configured in accordance with an embodiment of the present invention. In other embodiments the hub 12 may be integrated into an article of clothing (for example a belt buckle or utility belt) or a firearm and need not necessarily be a separate unit. In other instances, the hub may be designed to be carried in a pocket or on a lanyard worn around an individual's neck. In still other embodiments, the hub may be integrated in another instrument, such as a portable radio, mobile phone, or other device.

In the example illustrated in FIG. 1, the police officer 10 is also equipped with a non-lethal, electroshock weapon 14, such as a Taser™, as sold by Taser International, Inc. of Scottsdale, Ariz., and a firearm 16. In other examples, police officers, private security guards and other individuals may be equipped with additional or different instruments, such as batons, rifles, etc. In accordance with embodiments of the present invention, firearm 16 and electroshock weapon 14 (and, optionally, other instruments worn or carried by police officer 10) are configured with embedded sensors that are communicatively coupled to hub 12 over a wireless communications network, such as a Bluetooth or BLE network. In the case of an embedded sensor in firearm 16, such a sensor may be configured to act as an integrated electrical and mechanical gating device to control the function of a firing pin or equivalent, preventing the firearm from being fired in the absence of an authorization signal received by the sensor (or, disabling the firearm upon receipt of a disable signal). Alternatively, or in addition, the embedded sensor may be configured to transmit a signal upon the respective firearm being moved and/or a safety mechanism being deactivated or mode selection mechanism being engaged. Likewise, the embedded sensor in electroshock weapon 14 may be configured to exert control over the firing mechanism of the device, preventing such firing in the absence of an authorization signal (or permitting firing only in the absence of a disable signal) and/or reporting on operation and/or movement of the weapon.

Although intended primarily for use with handheld firearms and related instruments, for example, pistols, revolvers, rifles, electroshock weapons, etc., the present invention may be adapted for use with any firearm or similar instrument. Therefore, as used herein, the term firearm should be understood as including handheld firearms, electroshock weapons, and other, similar instruments, as may be used by law enforcement personnel, private security personnel, military personnel, hunters, individuals engaged in personal safety activities, and others. Further, while the embedded sensor may be a separate module that is integrated into the firearm as an aftermarket accessory, in some instances the functionality provided by the embedded sensor may be integrated within the firearm at the time of its manufacture, either as a separate module or as an embedded part of the mode selection or safety mechanism. Therefore, the use of the term embedded sensor is for convenience only and should be understood to include integrated modules and similar mechanisms providing the functionality described herein. Such sensors and the hub 12 may find application in both consumer as well as commercial applications.

Figure 2:
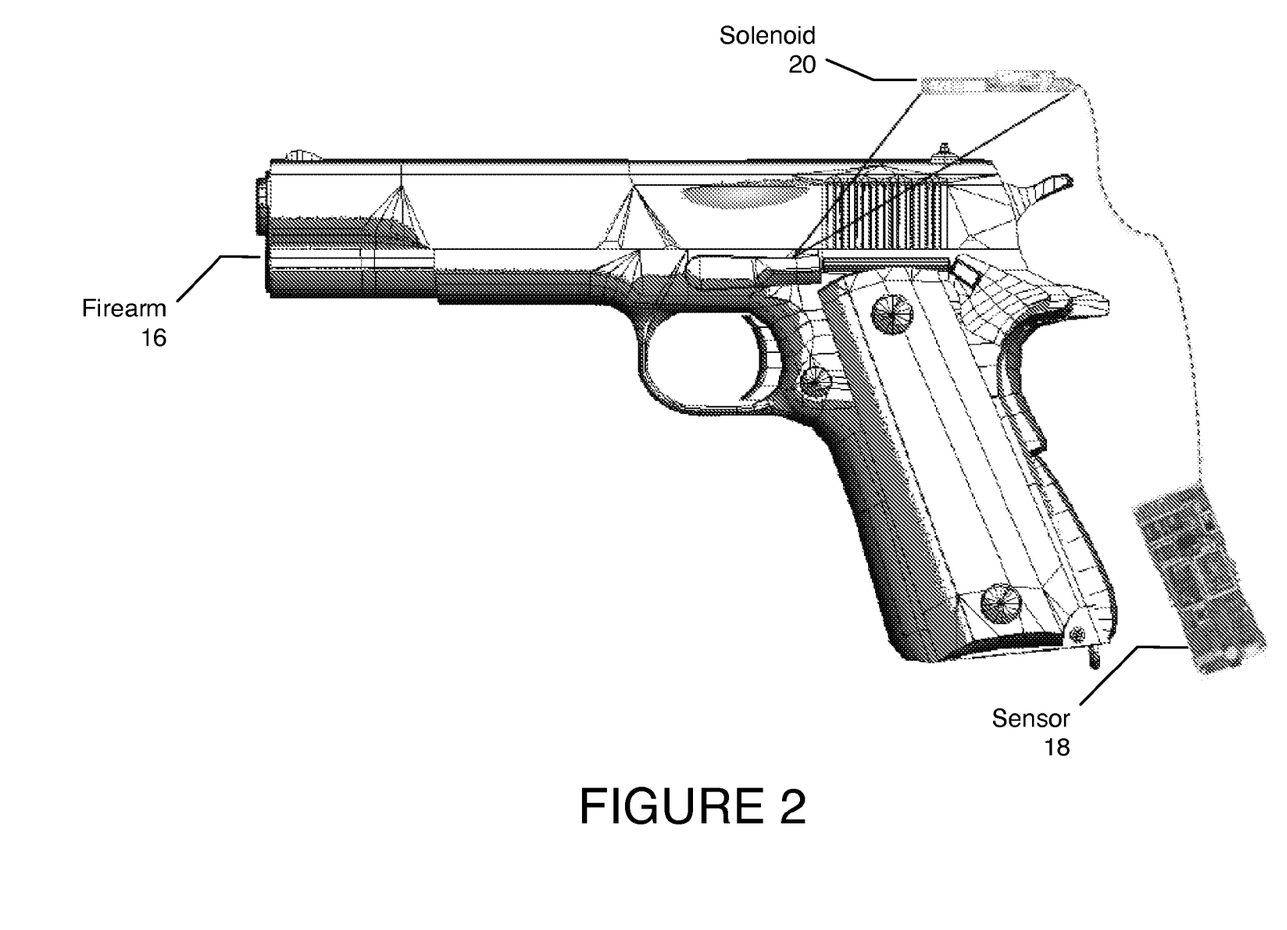
FIG. 2 illustrates an example of a firearm having an embedded sensor, in accordance with an embodiment of the present invention.

FIG. 2 illustrates an example of an embedded sensor 18 for a firearm 16. In this example, the sensor 18 has an associated solenoid 20, which acts as a mechanical gating device (under the control of sensor 18) to control the function of a firing pin or equivalent, preventing the firearm 16 from being fired in the absence of an authorization signal received by the sensor 18. In other examples, the sensor simply monitors the operation of the firearm 16.

Because different firearms have different safety mechanisms, a detailed discussion of such mechanisms is not included herein. For purposes of the present invention, it is sufficient to recognize that virtually all firearms include such safety mechanisms and it is intended that in some embodiments of the invention the embedded sensors will be included in a firing enable pathway and use a solenoid so as to act as an electrical-mechanical trigger safety gating means to permit or prevent such firing. In some instances this may require retrofitting of the firearm to include a suitable firing detent mechanism that can be enabled or disabled through an electronic signal from the sensor device. In other instances, new firearms may be designed and constructed for inclusion of such enable/disable means. For firearms with electrical firing mechanisms, the sensor device may be coupled to a switch in an electrical pathway in the firing mechanism and may be used to close or open the switch in accordance with firing authorization having been received or not.

More specifically, in one embodiment of the invention a blocking or gating means (which in one embodiment may be a cylindrical metal bar or rod) moves along an axis between a safety position and a firing position initiated by the action of a solenoid (energized/not energized), responsive to communications via the electronic components of the sensor (e.g., an electrical pulse). The blocking or gating means is movable between a first position, where the firing pin is operable to discharge the firearm, to a second position, where it is not. A first electric pulse causes the solenoid to move the blocking or gating means from the first position to the second, and a second electric pulse causes solenoid to return the blocking or gating means to its original position.

Although not shown in detail in FIG. 2, it should be appreciated that each sensor 18 may be integrated within a firearm or similar instrument and provided a power source. For example, the sensor may include its own battery. The battery may be rechargeable, in which case facilities for recharging same may be integrated within the firearm. For example, the firearm may be configured with a port to permit coupling to an external power source to facilitate recharging of an integrated battery. In another example, a battery charger clip (not shown) may be provided as a temporary replacement of an ammo clip or magazine. The firearm owner may be notified of battery status via an indicator light or other means (e.g., by a signal issued from the sensor to the hub and, optionally, subsequently reported by the hub to a mobile device or website that can be reviewed by the user). Recharging of the battery may then be accomplished by replacing an ammunition clip with the charging clip. The charging clip may include a battery, so as to recharge the sensor battery therefrom, and/or may include a transformer so as to recharge sensor battery from a power line outlet. In practice, the sensor is designed to consume very little power so that recharging is needed only infrequently. As indicated above, in embodiments of the invention the sensor 18 is configured with a short range radio frequency communications transceiver (or equivalent), such as a Bluetooth or BLE transceiver.

Figure 3:
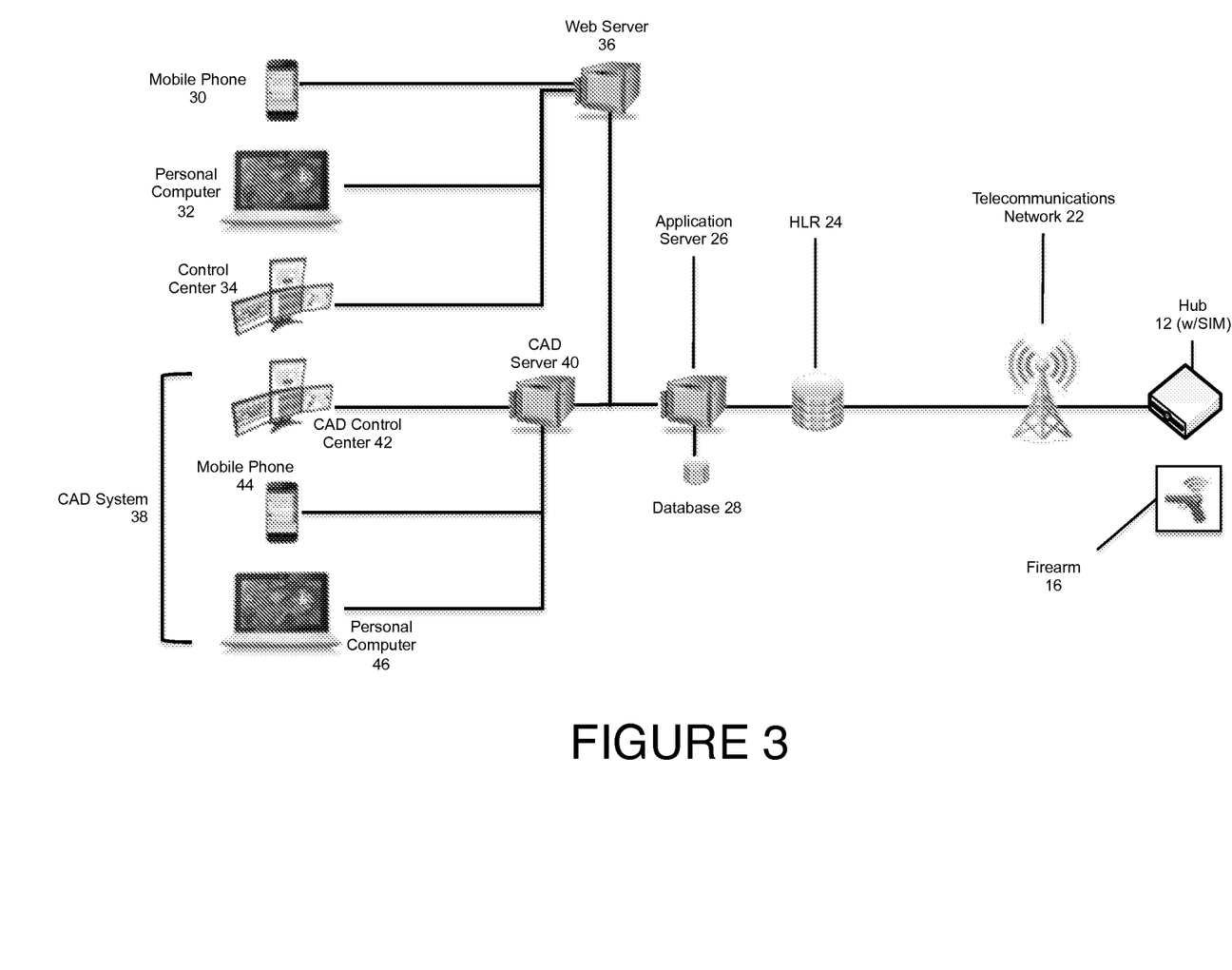
FIG. 3 illustrates an example of a system configured for monitoring and, optionally, controlling, a firearm configured with an embedded sensor over a signaling channel of a wireless communications network in accordance with embodiments of the present invention.

Turning now to FIG. 3, the sensor included in firearm 16 is seen as one element of a monitoring and safety system that includes a number of cloud-based components, user interface components, and, optionally, a computer-aided dispatch (CAD) system which may also include Geographic Information System (GIS) software. The sensor in firearm 16 (and similar such sensors included in other instruments) communicates over a wireless communications network with hub 12. Hub 12 is configured with both a wireless communications transceiver to communicate with the sensor included in firearm 16 and a second wireless communications transceiver to communicate with other components of the monitoring system over a signaling channel of a mobile telecommunications network 22. Included as part of the second wireless communications transceiver or modules associated with same is a subscriber identity module (SIM). Thus, the hub 12 includes one or more integrated circuits, similar to that used in mobile phones, having an onboard microcontroller, random access and read only memory (which stores an operating system), and an electrically erasable programmable read only memory that stores personality information such as a unique identifier, e.g., an international mobile subscriber identity (IMSI), and a related cryptographic key that is used to identify and authenticate a subscriber on a mobile telephony network. The SIM may also store one or more of a unique serial number, a personal identification number (PIN) and a personal unblocking code (PUK) for unlocking the PIN. Other logical and physical characteristics of the SIM may be such so as to be compatible with European Telecommunications Standards Institute specification TS 11.11, and/or $3^{rd}$ Generation Partnership Project (3GPP) specification TS 51.011 and TS 31.102. Applications may also be stored on the SIM, for example applications such as those described herein which facilitate communications between the SIM and a mobile device. Application toolkits which facilitate development of such applications are described in various specifications of the 3GPP and ETSI and are well known in the art and so will not be repeated herein.

Importantly for purposes of the present invention, SIMs store network-specific information used to authenticate and identify subscribers on a mobile telephony network. These identifiers include an integrated circuit card identifier (IC-CID), which identifies both the issuer of the SIM as well as a unique account number (e.g., of the subscriber), and the IMSI, which identifies the SIM to the network. In operation, the SIM also stores network state information, including a location area identity (LAI), which is updated whenever the SIM changes locations.

The SIM, as a component of the present system, is configured in accordance with embodiments of the present invention to transmit and receive signals over a dedicated signaling channel of wireless telecommunications network 22. Such mechanisms are commonly referred to as common channel signaling, distinguishing them from channel associated signaling which involves transporting signaling information on the same channel as will ultimately carry a voice conversation. Common channel signaling provides a distinct advantage in that the path and facility used to transport the signaling information is distinct from the channels that carry voice conversations, allowing for significant performance improvements in both the time it takes to communicate the signaling information and the use of network facilities. In the United States, common channel signaling is usually referred to as SS-7, which refers to a set of standards defining telephony signaling protocols. Thus, the present invention makes use of the SS-7 signaling channel of a wireless telecommunications network 22, which in one embodiment is a GSM telecommunications network.

In a GSM telecommunications network, a mobile switching center (MSC) is responsible for setting up and releasing end-to-end connections, based on signaling information received over the SS-7 signaling channel. The MSC is generally included within a mobile telephone switching office (MTSO) and is communicatively coupled to a home location register (HLR) and a central database that stores information concerning each subscriber authorized to use the network. This information includes the IMSI associated with the SIM and the current LAI.

In accordance with the present invention, communications between a SIM in hub 12 and an HLR 24 over the SS-7 signaling channel make use of USSD (Unstructured Supplementary Service Data) messages. USSD messages may be up to 182 alphanumeric characters per signaling packet. USSD messages create a real-time connection during a USSD session. The connection remains open, allowing a two-way exchange of data. This makes USSD sessions ideally suited as a communications vehicle between SIMs included in hub 12 and applications (e.g., instantiated on mobile phones 30, personal computers 32 and/or similar devices, and/or control centers 34) configured to permit firearm owners and/or users to authorize or block the use of those firearms (e.g., by authorizing or preventing the release of the firearm's safety mechanism). Some characters within the 182-character packet are otherwise un-used for transmission purposes and may be applied and used for transmission of sensor-related information, such as battery status, firearm status, etc., and for instructions signaling a solenoid to enable or disable a trigger safety mechanism.

As shown, hub 12 having a SIM that is configured in accordance with the present invention is communicatively coupled to a subscriber mobile device 30 over a wireless communications network 22. Details of the network 22 are not illustrated at this level; however, communications between the SIM and an application running on the mobile device 30 make use of the network's signaling channel rather than a voice or other channel. The application may be configured to provide alerts to the subscriber in response to the SIM signaling any movement or, optionally, attempted operation of the firearm and allows the subscriber to track such movements and/or enable or disable such operation remotely.

In addition to communicating the movement/attempted operation information to the mobile device 30, the network components may be configured to alert other units. For example, in the case of firearms associated with a police force or similar unit, alerts may be provided to a watch commander or other individual at control center 34, including via use of portable visual displays, such as mobile phone devices, where the control center itself may be mobile. This may act as a monitoring means for deployment of officers' firearms and/or an early warning indicator of the use of those firearms. Similarly, gun clubs and other private organizations may monitor the movements and/or use of their firearms (or members' firearms on the premises) so as to ensure they are being used and/or transported within guidelines established by the respective organizations. Personal computers 32 or control/command centers 34 may be used for such purposes.

Also shown in FIG. 3 is network equipment associated with a provider that offers the firearm monitoring service that is the subject of the invention. In some instances, the service provider may be the same provider that operates the telecommunications network 22, but more often then not it will be a different service provider. The provider's equipment is communicatively coupled to the telecommunications network 22 and includes an HLR 24 configured as with subscriber information as described herein. Also included in the provider's network are one or more servers, for example an application server 26 and web server 36, and associated rules databases 28, which are configured to issue enable/disable commands to a SIM in hub 12 according to rules established by a subscriber, including for example security firm, military, or law enforcement personnel, and information received from hub 12. For example, based on information from hub 12, the application server 26 may determine whether the firearm 16 is located within a permitted operating area established by the subscriber. If so, the server may issue an enable command to hub 12, which relays same over the short range wireless communications network to firearm or other device 16, permitting the use of the device. If, however, the firearm is determined to be outside the permitted area of operation, the server may be configured to prevent firing of the firearm, e.g., by sending a disable signal to the hub 12 to relay to the firearm. Alternatively, such "geo-fences" may be established to prevent firearm operation within a designated area (such as a building and is associated grounds, a park, etc.). These baseline enable/disable instructions may be overridden by a subscriber through use of an application running on mobile device 30. Note that although application server 26, web server 36 and rules database 28 are shown separately, the functions of these units may be included, in some embodiments, within HLR 24.

Also shown in FIG. 3 is optional integration of the present system with a computer aided dispatch (CAD) system 38. CAD system 38 may include one or more servers 40 and an associated CAD control center 42. CAD control center 42 may be used to assist in the dispatch of emergency services personnel, such as police officers, firefighters and emergency medical personnel. Communications provided through CAD control center 42 are typically routed to and from dispatchees via a mobile data terminal (MDT) on the dispatchee's person or in an associated vehicle. CAD control center 42 may also be configured to store and retrieve data (e.g., radio logs, field interviews, client information, schedules, etc.) from the MDU.

In accordance with embodiments of the present invention, the CAD control center also receives information from hub 12 as hub 12 communicates with sensors embedded in firearm 16 and other devices. Thus, a dispatcher may be provided with information concerning the movement, discharge or other operation of a firearm or other instrument and may relay such information through the CAD control center to other emergency services personnel. Alternatively, CAD server 40 may relay such information automatically, for example by sending alerts to mobile phones 44 and/or personal computers 46 (or MDUs) used by such personnel.

Thus far the hub 12 has been described primarily as a relay unit for communicating with one or more sensors embedded in firearms and related instruments. In some embodiments, the hub may include additional features, such as location determining devices (e.g., global positioning system (GPS) receivers), and sensors for detection of illegal drugs, chemicals, gasses, and vapors associated with explosive devices, etc. Information obtained by such receivers/sensors may be communicated to a control station and/or mobile device, etc., via the same signaling channel used to relay information from a firearm. Thus, the hub may serve as a central communications facility for instrumentation and equipment carried by a police officer, security guard, soldier or other individual.

Thus, in one embodiment the present invention includes sensor devices in one or more firearms or related instruments, a personal hub that includes a SIM and, optionally, other receivers/sensors, and which is configured to communicate information received over a short range wireless communication network from the sensors associated with the firearms and related instruments to a remote monitoring station via a signaling channel of a wireless telecommunications network. In addition to information received from the embedded sensors associated with the firearms and related instruments, the hub may also communicate information from its own associated receivers and/or sensors over the wireless telecommunications network to provide operators at the remote monitoring station with a more complete description of the environment in which the user associated with the firearms is operating. The hub is also configured to receive information over the signaling channel of the telecommunications network from the remote monitoring station (and/or other sources) and, responsive thereto, to send commands via the short range wireless network to the embedded sensors associated with the firearms and related instruments to enable/disable operation of those firearms or related instruments.

In various embodiments, the sensors associated with the firearms and other instruments may be configured to provide an alert upon one or more of: movement of the firearm, an attempted operation of the firearm, disabling of a safety of the firearm, and a change in mode of the firearm. To facilitate such actions, the sensor may include a motion detector. Upon receipt of such an alert, the hub 12 may be configured to transmit same to the remote monitoring station over the telecommunications network. In one embodiment, the sensor associated with a firearm or related instrument may be configured to periodically transmit an electronic heartbeat signal to the hub so that the hub knows the associated firearm is nearby (it is envisioned that the short range wireless communication network over which the hub and firearm sensor communicate has an effect range of a few meters to perhaps a few tens of meters). In the event the hub does not receive a heartbeat signal (which may be coded to uniquely identify the associated firearm or related instrument), the hub may transmit an alert message to the remote control station to act as a warning that the firearm has potentially become separated from its authorized user.

To this end, hubs may be configured to operate only with designated sensors (firearms) but to detect the heartbeats transmitted by other sensors. In this way, a hub passing near a location of a stolen firearm may detect a heartbeat transmitted by that firearm, and, upon recognizing that the heartbeat is not associated with a sensor for which the hub is configured to operate, may pass the heartbeat information to a remote control center. At the remote control center, the heartbeat may be decoded to identify the associated firearm and, if recognized as being associated with a stolen firearm, an alert may be provided to law enforcement and/or other personnel in the area (e.g., via a CAD MDU). In some cases, the remote control center may wirelessly configure the hub that received the heartbeat from the stolen firearm to communicate with the sensor associated with that firearm and disable the firearm.

Within buildings and other structures or urban canyons, location determination based on Global Positioning System (GPS) receivers is not always reliable or accurate. Accordingly, the hubs are not limited to the use of GPS location determination but may also include other location determination means, such as mobile telecommunications network triangulation using femtocell devices deployed to provide cell tower location coordinates. Use of femtocell triangulation requires installing low-powered cellular base stations that have a range of approximately 40 feet. Such femtocell technology works well within buildings, for precise floor, hallway, or similar location determinations.

In accordance with embodiments of the invention, a SIM of a hub 12 communicatively couples the sensor embedded in a firearm 16 over a wireless network to a cloud-based platform (e.g., an HLR) that includes computer-based decision-making and database rule-sets for signaling information. The cloud-based platform is further communicatively coupled to a mobile device (such as a smart phone) and/or control center, which includes a firearm monitoring and safety application. The application enables the firearm owner or other user to communicate with the sensor in the firearm, for example to receive status information such as alerts produced by motion sensors included in the firearm. The user can respond to such alerts via a user interface of the application, for example to cause a solenoid to cause blocking or gating means included in the firearm to move between a first position and a second position, and vice versa. In other embodiments, the sensor may be enabled solely for purposes of tracking the location of the firearm and may not play a role in enabling or disabling the firing of the weapon.

In operation, when a hub configured in accordance with the present invention is powered on, it enters an initialization mode in which the SIM searches for a nearest base transceiver station (BTS) of a wireless telecommunications network. To facilitate communications between the SIM and the network equipment, the hub may include a radio transceiver and an antenna. The antenna may be located at or near the exterior surface of the hub and/or may have an exposed portion thereof so as to provide for a robust communication pathway.

In the initialization mode, the SIM included in the hub scans for a signal from one or more BTS signals and, if there is more than one, will generally select the one with the strongest received signal strength and that has a system identifier indicating compatibility with the SIM's network operator. The system identifier is typically broadcast by a BTS on a control channel. Once a BTS has been selected, the SIM will register with the network and, if the carrier that operates this network is not the same carrier as operates the firearm monitoring service of the present invention, the network operator will signal (using an SS-7 channel) the appropriate home carrier (i.e., the carrier associated with the present firearm monitoring service).

Network registration may vary depending on the country and/or carriers involved, but generally will include the SIM selecting a channel slot for transmission and, through the use of the radio transceiver, using the signal control path to transmit its associated phone number and IMSI to the BTS. The BTS forwards the signaling information to the local network operator's MTSO, which initiates a handshake with the SIM. The SIM responds with its unique authentication key, which is then used for encrypting and authenticating all further communications between the SIM and the MTSO. While a SIM is powered on, network registration is automatic and ongoing, occurring every several seconds and lasting only a few milliseconds. Power consumption during such registration operations is minimal.

The SS-7 protocol for SIM network registration includes specific signaling packet length(s), field(s) identity, and character length, and in addition to phone number and IMSI, the fields include a "message waiting indicator" and "feature request." These fields may be used in accordance with the present invention for communication of some of the information required for geospatial location awareness and an "enable" or "disable" instruction over the SS-7 signaling channel.

Mobile communications between the BTS and the hub occurs through the use of radio signaling transmissions, using a full-duplex configuration and separate transmit and receive frequencies. The BTS transmits on the frequency that the hub receiver is tuned to, while the hub transmits on the radio frequency that the BTS receiver is tuned to. The BTS acts as a conduit for information transfer between the hub and the MTSO. Subscriber-specific information for use by the MTSO is contained in the HLR, which also performs an important role in tracking the hub (i.e., its associated SIM) as it moves around the network. In one embodiment, this tracking involves the use of LAI information stored by the SIM.

During registration, the SIM stores network state information, including the LAI, received from the BTS. When the firearm changes location and/or the mode of the firearm is changed (e.g., going from a "safe" mode to a "fire" mode or a "single shot" mode to a "semi-automatic" mode, etc.), the SIM stores the new LAI. Further, in accordance with the present invention, the SIM encrypts the LAI and stores it in a dial buffer of the device.

Thereafter, and periodically, a server operated by the firearm monitoring service provider may attempt to place a voice call to the SIM. This is done using the SIM information stored in the HLR. The SIM, however, is configured not to accept voice calls and responds to the attempt with a "do-not-allow" or "wink-back" message. In accordance with the present invention, this message includes the contents of the dial buffer; i.e., the encrypted LAI. At the server, the dial buffer information is combined with the information gleaned from an SS-7 "location request" solicited by the server to provide detailed location information for the SIM (i.e., for the associated firearm). Because no actual voice or data transmission occurs power consumption is minimized in these transactions. In some instances, Global Positioning System (GPS) information may be included in addition to LAI in order to further define the location of the firearm user. The GPS information may be associated with the hub (if so equipped) and/or with the BTS in communication with the SIM.

To facilitate the operations described herein, the service provider's HLR 24 is configured to include parameters useful for monitoring firearms, which parameters may include but are not limited to: name of registrant (often, though not necessarily the firearm owner), purchase date, make and type of firearm, location purchased, description of authorized use areas (i.e., description of geo-fence boundaries), description of authorized use dates and/or times (e.g., times-of-day/days-of-week, etc.). An associated database 28 is configured with rule sets that define messages to be sent to a hub. For example, rules that are based on HLR parameters defining geo-fences and/or use dates and/or times may be provided. When information from a hub is received at the server, the server consults the HLR to retrieve the associated use parameters for firearms associated with that hub and issues instructions in accordance with those parameters. For example, in the case of a subscriber that has defined permitted uses of a firearm to be on weekends from 09:00 to 11:00, upon receipt of a signal from a hub indicating that a safety has been disabled, the server will retrieve the associated parameters from the HLR, compare the permitted use days/times with the current day/time and issue an enable or disable instruction to the hub for relay to the firearm accordingly. Similar enable/disable instructions based on geo-fence rule sets and decisions based upon real-time receipt of hub location information may also be dispatched. Logs of such decisions and instructions may be kept for later review and assessment.

Ideally, the HLR and any associated database are accessible only via authenticated accesses by the firearm owner and/or authorized individuals. In some countries, law enforcement personnel may be permitted to access and/or override certain parameters. For example, in some countries, law enforcement personnel or governmental authorities may be able to enforce firearm-free zones through one or more default HLR parameters applied to all firearms registered with the service provider. Changes in HLR parameters may, in some circumstances, also be subject to "waiting periods" in order to permit review by law enforcement or other governmental authorities.

Applications running on a subscriber's mobile device may be used to configure the geo-fences and other parameters stored at the HLR. In addition, the application may be used to receive location information concerning the hub. For example, subscribers may use the application to poll the HLR for current location information and/or may receive alerts when location updates are received by the HLR in response to detected movements of the firearm.

The computer- or controller-based devices described herein generally will include includes a bus or other communication mechanism for communicating information, and a processor coupled with the bus for processing information.

Such devices also will include main memory, such as a RAM or other dynamic storage device, coupled to the bus for storing information and instructions to be executed by processor. Main memory also may be used for storing temporary variables or other intermediate information during execution of instructions to be executed by processor. Such devices further will include a ROM or other static storage device coupled to the bus for storing information and instructions for the processor. A storage device, such as a hard disk or flash drive, may also be provided and coupled to the bus for storing information and instructions. Execution of the sequences of instructions contained in the main memory, ROM and/or storage device causes the processor to perform the process steps described herein. Such devices also include a communication interface coupled to the bus, which communication interface provides a two-way data communication path as is known in the art. For example, such a communication interface may be a local area network (LAN) interface to provide a data communication connection to a compatible LAN.

Thus, methods and systems for monitoring and, optionally, controlling, handheld firearms and related instruments that make use of one or more embedded sensors configured to send and receive signals over a wireless communications network have been described. In various embodiments, the present invention provides a safety mechanism for a firearm in which a personal hub is used as a communications gateway to and from the firearm and, optionally, a decision-gate in the firing enable path thereof.

What is claimed is:

1. A system, comprising a firearm having included therein a sensor configured for wireless communication over a short range radio frequency (RF) network and a hub worn on the person of a user of the firearm, the hub including a subscriber identity module (SIM) configured to receive communications from the sensor over the short range RF network using a first transceiver and transmit communications to and receive communications from a monitoring station over a signaling channel of a wireless telecommunications network compliant with signaling system 7 (SS-7) using a second transceiver, wherein the communications from the sensor are transmitted by the sensor in response to a detected disabling of a safety mechanism of the firearm and location area identity (LAI) information received from a base transceiver station (BTS) via the wireless communications network is stored in a dial buffer of the SIM in response to the detected disabling of a safety mechanism of the firearm.

2. The system of claim 1, wherein the hub is further configured to communicate with a plurality of sensors over the short range RF network, each of the sensors associated with a respective firearm or other instrument.

3. The system of claim 1, wherein the sensor is configured to enable/disable operation of the firearm in accordance with instructions received from the hub.

4. The system of claim 1, wherein the monitoring station comprises a computer aided dispatch system.

* * * * *